United States Patent
Baum et al.

(10) Patent No.: US 8,281,137 B2
(45) Date of Patent: Oct. 2, 2012

(54) METHOD AND APPARATUS FOR DETERMINING WHETHER OR NOT A REFERENCE PATTERN IS PRESENT IN A RECEIVED AND POSSIBLY WATERMARKED SIGNAL

(75) Inventors: Peter Georg Baum, Hannover (DE); Michael Arnold, Isernhagen (DE); Ulrich Gries, Hannover (DE); Walter Voessing, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 932 days.

(21) Appl. No.: 12/321,071

(22) Filed: Jan. 15, 2009

(65) Prior Publication Data

US 2009/0187765 A1   Jul. 23, 2009

(30) Foreign Application Priority Data

Jan. 21, 2008   (EP) .................................. 08100694

(51) Int. Cl.
  *H04L 9/32* (2006.01)
(52) U.S. Cl. ...................................................... 713/176
(58) Field of Classification Search .................. 713/178, 713/200; 380/207, 237–238
  See application file for complete search history.

(56) References Cited

U.S. PATENT DOCUMENTS 6,700,990 B1 * 3/2004 Rhoads .......................... 382/100
6,954,857 B2 * 10/2005 Pelly et al. ..................... 713/176

FOREIGN PATENT DOCUMENTS

| EP | 1 542 227 A1 | 6/2005 |
| WO | WO 2005/078658 A1 | 8/2005 |
| WO | WO 2007/006623 A1 | 1/2007 |

OTHER PUBLICATIONS

European Search Report dated Apr. 24, 2008.

* cited by examiner

*Primary Examiner* — Jason K. Gee
*Assistant Examiner* — Abiy Getachew
(74) *Attorney, Agent, or Firm* — Myers Wolin, LLC

(57) ABSTRACT

Many watermarking systems make use of correlation for calculating a detection metric, which means that several reference patterns are generated at encoder side and one or more of them are embedded inside the content signal, dependent on the message to be embedded. To decode the embedded message, it is necessary to discover which reference pattern was embedded at encoder side by correlating the known reference patterns with the content signal. In the case where watermarked audio is emitted by a loudspeaker and then captured with a microphone, the received signal echoes are used for watermark detection instead of treating them as noise by integrating the correlation values resulting from echoes into the main correlation peak, thereby using correlation result amplitude values located within a predetermined neighborhood of a correlation result peak amplitude value and exceeding a predetermined threshold.

7 Claims, 3 Drawing Sheets

METHOD AND APPARATUS FOR DETERMINING WHETHER OR NOT A REFERENCE PATTERN IS PRESENT IN A RECEIVED AND POSSIBLY WATERMARKED SIGNAL

This application claims the benefit, under 35 U.S.C. §119 of European Patent Application 08100694.2 filed Jan. 21, 2008.

FIELD OF THE INVENTION

The invention relates to a method and to an apparatus for determining whether or not a reference pattern is present in a received and possibly watermarked signal, using correlation and correlation result peak detection.

BACKGROUND OF THE INVENTION

A watermark in an audio or video signal can be detected at receiving or decoder-side using correlation, as described for example in WO 2007/031423, WO 97/33391 (U.S. Pat. No. 6,584,138 B1) or U.S. Pat. No. 6,061,793.

Many watermarking systems make use of correlation for calculating a detection metric, which means that several pseudo-random sequences or reference patterns are generated at encoder side and one or more of them are embedded inside the content (e.g. an audio or video signal), dependent on the message to be embedded. The same pseudo-random sequences are generated at decoder side. Frequency transform may be used to encode and decode the embedded message. To decode the embedded message, it is necessary to discover which pseudo-random sequence or sequences were embedded at encoder side. This is determined in these systems by correlating the known pseudo-random sequences with the possibly watermarked content, whereby the correlation may operate on a pre-processed version of the content, and that pre-processing may include inverse frequency transform, spectral shaping and/or whitening.

Each embedded reference pattern may represent a single bit of the embedded message. There are watermarking systems in which each embedded reference pattern is representing two or more bits of the embedded message.

In WO2005/078658, clusters of correlation results are evaluated, a cluster including correlation results in the vicinity of a correlation peak and exceeding a detection threshold.

A watermark detector decides, depending on the size of the correlation result values, whether or not a given pseudo-random sequence was embedded.

A related improved decision processing is described in PCT/US2007/014037, where the calculation of relative correlation result values decreases the false positive rate, i.e. the probability to classify a non-watermarked content as watermarked. It is believed that this processing works very well even if the watermarked content is altered for example by perceptual coding (like mp3, AAC, WMA, AC-3, MPEG).

SUMMARY OF THE INVENTION

However, that kind of decision processing does not provide correct decisions if for example watermarked audio is emitted by a loudspeaker and then captured with a microphone. This happens e.g. in pirated copies recorded in a cinema or in a program audience measurement application where a fixed or mobile watermarking detector is used. The recorded content includes echoes and reverberation, with which kind of signal disturbances known watermark detection processings cannot cope in the right manner.

A problem to be solved by the invention is to improve the robustness with respect to echoes and reverberation of correlation-based watermark detection systems.

According to the invention, it is taken advantage of the received signal echoes instead of treating them as noise. The watermark detection result is improved by distinguishing between noise and echoes and integrating the correlation values resulting from echoes into the main correlation peak. Basically, the correlation result amplitude values located within a predetermined neighborhood of a correlation result peak amplitude value and exceeding a predetermined magnitude are summarized.

In the invention, every embedded reference pattern r represents a single bit only, or two or more bits only, of the embedded message. The reference patterns r are orthogonal to each other.

Advantages of the invention are:
- the robustness of the embedded watermark (detection) is increased without compromising the quality of the watermarked audio signal;
- known watermarking processings can be optimized without impact on the workflow on the watermark encoding side;
- because the invention is related to the watermark detection only but not to the watermark embedding, existing watermarking systems can be improved without need for re-marking already marked content;
- the inventive optimization can be applied to all watermarking system using correlation as their detection metric.

In principle, the inventive method is suited for determining whether or not a reference pattern is present in a received and possibly watermarked signal, wherein at least one candidate reference pattern possibly matching said reference pattern is correlated with said received watermarked signal and corresponding correlation result amplitude peaks are checked, said method including the following steps:
- calculating for a current section of said received signal the correlations with each one of said reference patterns;
- finding within the correlation result amplitude values groups of values in which the absolute value of a current correlation result amplitude value—denoted main peak—is greater than a first threshold and that absolute value of said main peak is also greater than the absolute value of its left neighbor correlation result amplitude value and is also greater than the absolute value of its right neighbor correlation result amplitude value;
- finding, within a predetermined vicinity of each one of said main peaks, further peaks for each of which the absolute value of a current correlation result amplitude value is greater than a second threshold smaller than said first threshold and for each of which further peaks its absolute value is also greater than the absolute value of its left neighbor correlation result amplitude value and is also greater than the absolute value of its right neighbor correlation result amplitude value;
- combining, for each one of said groups of values, the absolute values of said main peak and said further peaks, thereby forming a sum value per group;
- for each one of said reference patterns, determining the maximum one of said group sum values wherein, if the largest one of these maximum values exceeds a predetermined or variable threshold, deciding that a corresponding reference pattern is assumed to be present in the received signal.

In principle the inventive apparatus is suited for determining whether or not a reference pattern is present in a received and possibly watermarked signal, wherein at least one candidate reference pattern possibly matching said reference pattern is correlated with said received watermarked signal and corresponding correlation result amplitude peaks are checked, said apparatus including:

means being adapted for calculating for a current section of said received signal the correlations with each one of said reference patterns;

means being adapted for finding within the correlation result amplitude values groups of values in which the absolute value of a current correlation result amplitude value—denoted main peak—is greater than a first threshold and that absolute value of said main peak is also greater than the absolute value of its left neighbor correlation result amplitude value and is also greater than the absolute value of its right neighbor correlation result amplitude value;

and for finding, within a predetermined vicinity of each one of said main peaks, further peaks for each of which the absolute value of a current correlation result amplitude value is greater than a second threshold smaller than said first threshold and for each of which further peaks its absolute value is also greater than the absolute value of its left neighbor correlation result amplitude value and is also greater than the absolute value of its right neighbor correlation result amplitude value;

means being adapted for combining, for each one of said groups of values, the absolute values of said main peak and said further peaks, thereby forming a sum value per group;

means being adapted for determining, for each one of said reference patterns, the maximum one of said group sum values, and for deciding, if the largest one of these maximum values exceeds a predetermined or variable threshold, that a corresponding reference pattern is assumed to be present in the received signal.

BRIEF DESCRIPTION OF THE DRAWINGS

Exemplary embodiments of the invention are described with reference to the accompanying drawings, which show in.

DETAILED DESCRIPTION OF PREFERRED EMBODIMENTS

As mentioned above, many watermarking systems use a correlation based detection, which means that several pseudo-random sequences representing a bit or word value are generated, or selected from a memory, at encoder side and one or more of them are embedded inside the content or signal (e.g. an audio or video signal), depending on the message (e.g. watermark bits) to be embedded. The same pseudo-random sequences are generated, or selected from a memory, at decoder side. To decode the embedded message, it is necessary to discover which pseudo-random sequences were embedded inside the received content or signal. This is performed by correlating the known pseudo-random sequences with the possibly pre-processed content or signal. The decoder or receiver detector thereafter decides, depending on the size of the correlation result amplitude values, whether or not a given sequence was embedded.

The signal or sequence x of length N is defined as $x=(x(1), x(2), x(3), \ldots, x(N))$ where $x(n)$ is the n-th sample of the signal or sequence x. If the signal x and the pseudo-random reference pattern r are already synchronized, the normalized correlation value C can be calculated as:

$$C = \text{Sum\_}(i = 1 \ldots N)r(i)*x(i)/$$
$$sqrt(\text{Sum\_}(i = 1 \ldots N)(r(i)*r(i))) \ldots /$$
$$sqrt(\text{Sum\_}(i = 1 \ldots N)(x(i)*x(i)))$$
$$= \text{Sum\_}(i = 1 \ldots N)r(i)*x(i)/(\|r\|*\|x\|),$$

wherein $$\text{Sum}(i = 1 \ldots N) \text{ means } \sum_{i=1}^{N},$$

N is the length of signal x and sequence r, i is the index of the sample, and '$\| \ldots \|$' is the Euclidean norm. The Euclidean norm is defined as $$\|x\| = \sqrt{\left(\sum_{i=1}^{N} x(i)^2\right)} = sqrt(\text{Sum\_}(i = 1, \ldots, N)(x(i)*x(i))).$$

The greater the absolute value of C, the higher is the probability that current reference pattern r is embedded in x. A negative value of C indicates that the pattern r has been negated between the embedding and the detection stage.

However, usually x and r are not synchronized. In such case normalized correlation values for different offsets $\tau=1, 2, 3, \ldots, N$ (sometimes called correlation 'lag') are to be calculated as:

$$C(\tau) = \text{Sum\_}(i = 1 \ldots N)r(i)*x(i+\tau)/$$
$$sqrt(\text{Sum\_}(i = 1 \ldots N)(r(i)*r(i)))/$$
$$sqrt(\text{Sum\_}(i = 1 \ldots N)(x(i)*x(i)))$$
$$= \text{Sum\_}(i = 1 \ldots N)r(i)*x(i+\tau)/$$
$$(\|r\|*\|x\|), \tau = 1, 2, 3, \ldots, N.$$

For this kind of calculation, fast algorithms using FFTs (fast Fourier transforms) are available.

The corresponding offset $\tau$ between the signal x and a given reference sequence r is calculated by finding the value $\tau$ that maximizes $C(\tau)$.

Figure 1:
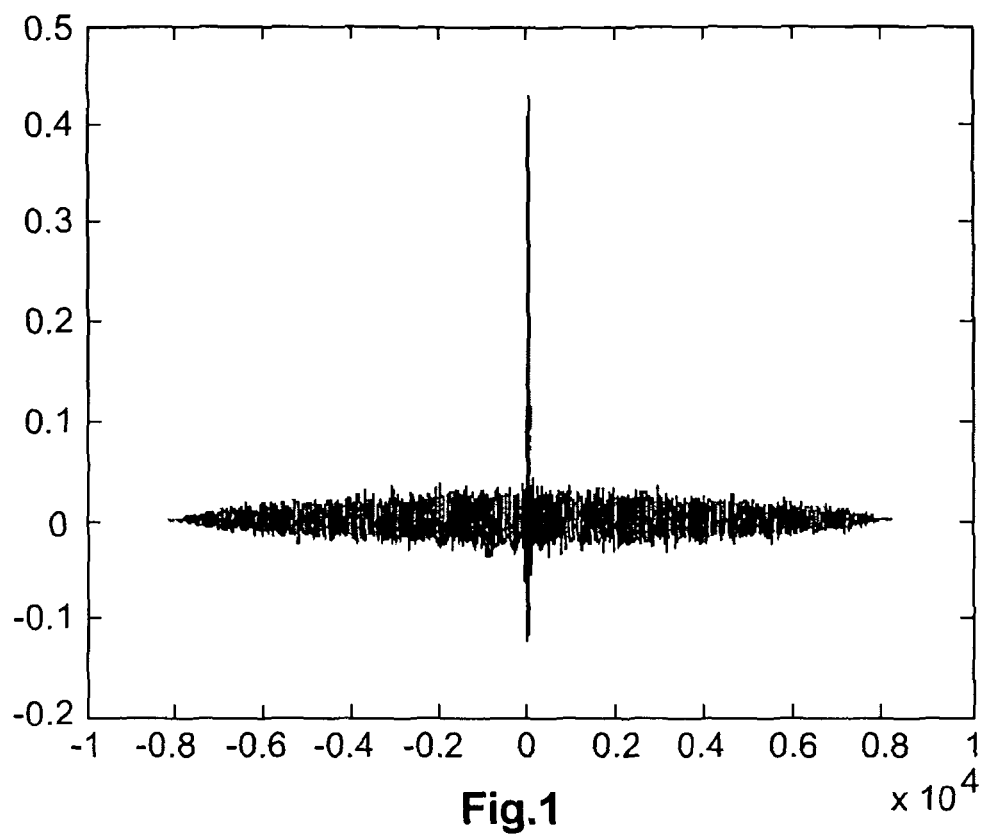
FIG. 1 correlation result values calculated at decoder side for a received signal with mildly disturbed content.

FIG. 1 shows correlation result values $C(\tau=0)$ calculated at decoder side for a received signal x with mildly disturbed content. The horizontal axis shows sample positions and the vertical axis shows the amplitudes of the correlation results. A clear high-amplitude peak related to horizontal position '0' can be determined.

In PCT/US2007/014037 it is proposed to use the difference or the ratio between the largest and the second largest normalized correlation values to make the watermark detection more robust.

Figure 2:
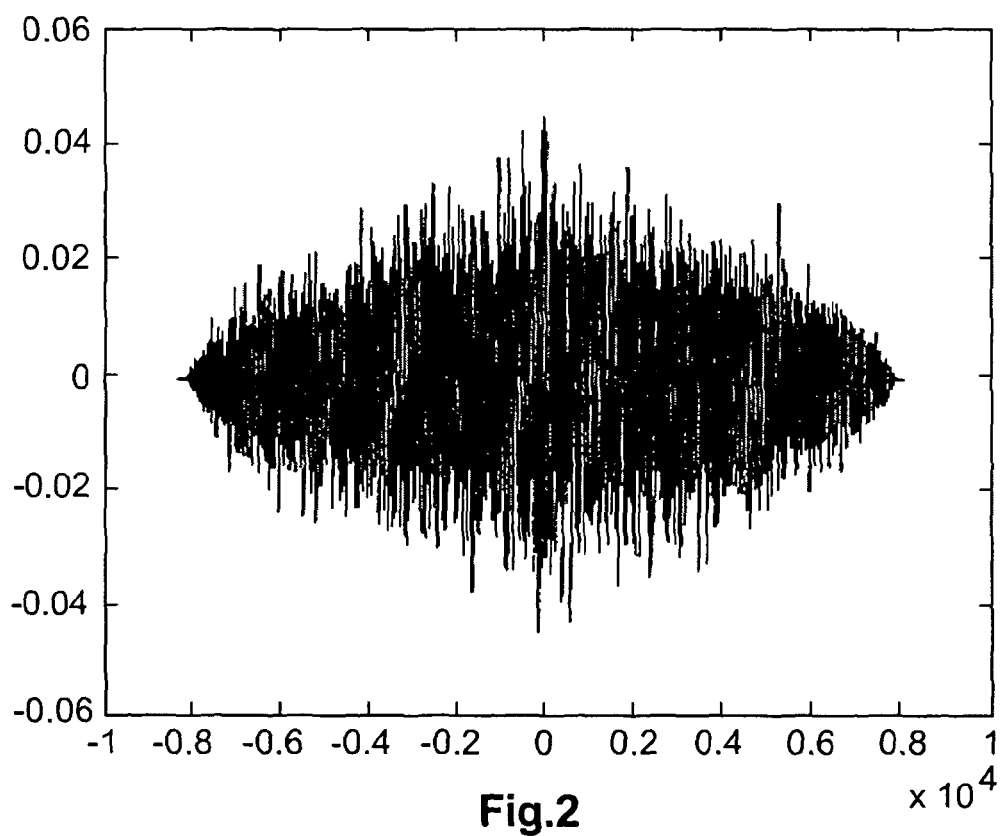
FIG. 2 correlation result values calculated at decoder side for a received signal that was transmitted by a loudspeaker and recorded with a microphone.

However, just finding the maximum of $C(\tau)$) does not work anymore if the received signal or content has undergone an acoustic path transmission, the corresponding decoder correlation results of which are depicted in FIG. 2. The very obvious amplitude peak in FIG. 1 is now much smaller and distributed in time due to echoes and reverberation. It even happens that the peak, which indicates the presence and offset of the reference signal r, is smaller than peaks resulting from noise in the received signal.

The inventive processing works as follows, wherein k is the index of the current pseudo-random reference pattern or sequence r:

a) Calculate for a current section of the received signal x the correlations $C_k(\tau)$ for each reference signal $r_k$ as described above, possibly after enhancing the audio signal or the reference signal with signal processing like e.g. filtering and/or whitening.
b) For each $C_k(\tau)$ find the largest cumulated peak sum (of peak groups).
c) Use the cumulated peak sum directly as correlation value, or divide the largest peak sum by the second largest peak sum and use the resulting value as a measure of the detection strength, as described in PCT/US2007/014037.
d) Decide that a watermark or reference pattern is assumed to be present if one of the k cumulated peak sums exceeds a predetermined or variable threshold, and move to the following section of the received signal x (the distances of the reference patterns are known at receiver/decoder side).

For all candidate pseudo-random reference sequences k, the cumulated peak sum $sum_{max,k}$ for a correlation is calculated as follows, wherein m is an index for a correlation peak group:

$m_k=0$;

For all amplitude values of $C_k(\tau)$ find groups of values subject to the condition $abs(C_k(\tau))>thr_1$ AND $abs(C_k(\tau))>abs(C_k(\tau-1))$ AND $abs(C_k(\tau))>abs(C_k(\tau+1))$ (wherein these $C_k(\tau)$ amplitude values can be denoted as main peaks),
do $m_k=m_k+1$ $sum_k(m)=0$ For all values y within group $m_k$ defined by $(\tau_{m,k}-t_1) \leq y \leq (\tau_{m,k}+t_2)$
do
  if $abs(C_k(y))>thr_2$ AND $abs(C_k(y))>abs(C_k(y-1))$ AND $abs(C_k(y))>abs(C_k(y+1))$
  do $sum_k(m)=sum_k(m)+peak\_sum_k(y)$ Find the maximum $sum_{max,k}=max(1 \leq n \leq m) sum_k(n)$ of the $sum_k(m)$ values all m groups.

The value $peak\_sum_k(y)$ is defined below. The maximum sum $sum_{max,k}$ is the cumulated peak sum mentioned above for candidate reference pattern k. There may be further maximum sums for the other candidate reference patterns k. If the largest one of these maximum sums exceed a predetermined or variable threshold $thr_0$, it is decided that a corresponding watermark or reference pattern (or pseudo-random reference sequence) k is assumed to be present in the received signal. Threshold $thr_0$ is greater than threshold $thr_1$.

Because every embedded reference pattern represents e.g. a single bit only of the embedded message and the distances of the reference patterns are known at receiver/decoder side, it is necessary to determine the true position τ (inside the received signal x) of the pseudo-random reference sequence k that was selected at encoder side, to determine the following portion of the possibly watermarked content for decoding the next single or two or more bits of the embedded message.

Figure 5:
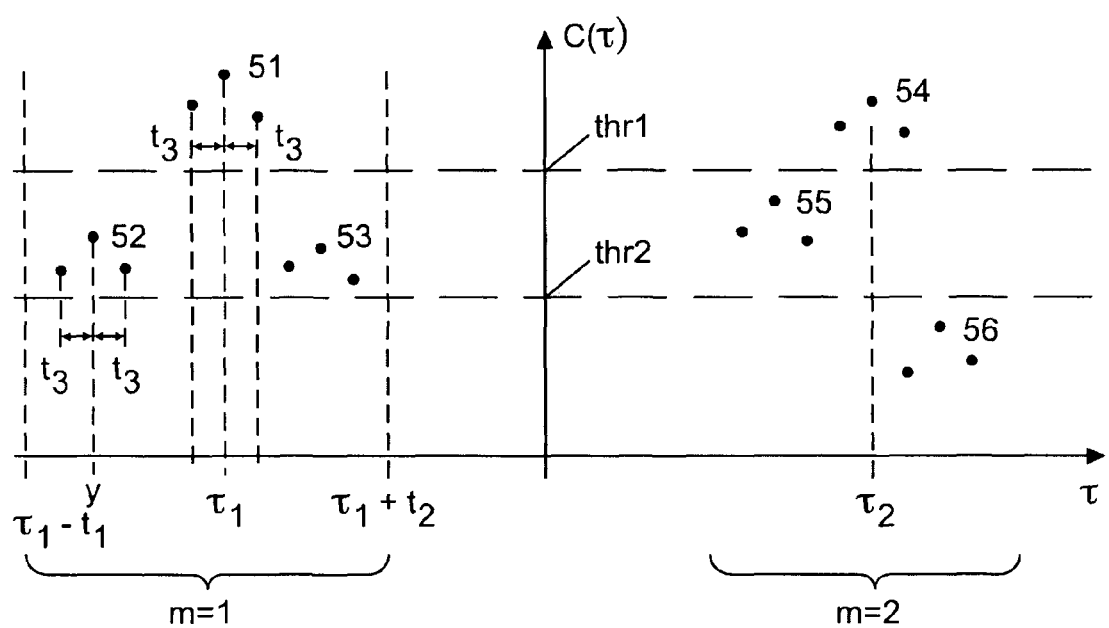
FIG. 5 inventive processing depicted in the correlation result amplitude vs. $\tau$ domain.

However, in order to distinguish the peak sum value more from noise, the peak sum $peak\_sum_k$ at location y may be calculated as follows:

$peak\_sum_k(y)=abs(C_k(y))$ $j=1$ while $(j<t_3$ AND $abs(C_k(y-j))>thr_3)$ $peak\_sum_k(y)=peak\_sum_k(y)+abs(C_k(y-j))-thr_4;$ $j=j+1$ $j=1$ while $(j<t_3$ AND $abs(C_k(y+j))>thr_3)$ $peak\_sum_k(y)=peak\_sum_k(y)+abs(C_k(y+j))-thr_4;$ $j=j+1$ As shown in FIG. 5 in the correlation result amplitude vs. τ domain, threshold $thr_1$ is used for searching the dominant or biggest peak 51, 54 for each group m. Groups $m_1$ and $m_2$ are depicted, whereby the dominant peak 51 of group $m_1$ is located at $\tau_1$ and the dominant peak 54 of group $m_2$ is located at $\tau_2$. Threshold $thr_2$ is smaller than threshold $thr_1$ and is used for searching smaller but still significant peaks 52, 53, 55, 56 (which may result e.g. from echoes) in the vicinity of the dominant peak. Thresholds $thr_3$ and $thr_4$ (not depicted) are related to the noise level. $thr_4$ represents an offset that is caused by the noise. In case the noise level can be estimated, threshold $thr_4$ can be calculated more exactly. Thresholds $thr_3$ is an additional threshold used to distinguish between the peaks and the noise, i.e. to elevate the peaks with respect to the noise, wherein $thr_3 \geq thr_4$. If there is no noise, $thr_3=thr_4=0$.

Advantageously, the $C_k(y)$ values within $y-t_3<y<y+t_3$ and adjacent to $C_k(y)$ can be used to increase the peak sum value so that the cumulated peak sum value distinguishes more from 'noise peaks'.

The amplitude thresholds $thr_0$, $thr_1$, $thr_2$, $thr_3$, $thr_4$, and the sample ranges $t_1$, $t_2$, $t_3$ and $t_4$ can be adapted depending on echoes and reverberation parameters of the application. The symmetric range $\pm t_3$ can also be non-symmetric $(-t_3 \ldots +t_4)$ or $(-t_4 \ldots +t_3)$. Further, the $C_k(y)$ values within $y-t_{3 or 4}<y<Y+t_{3 or 4}$ can be cumulated only in case their amplitude is not smaller than a predetermined amplitude distance from the amplitude of the corresponding peak.

Figure 3:
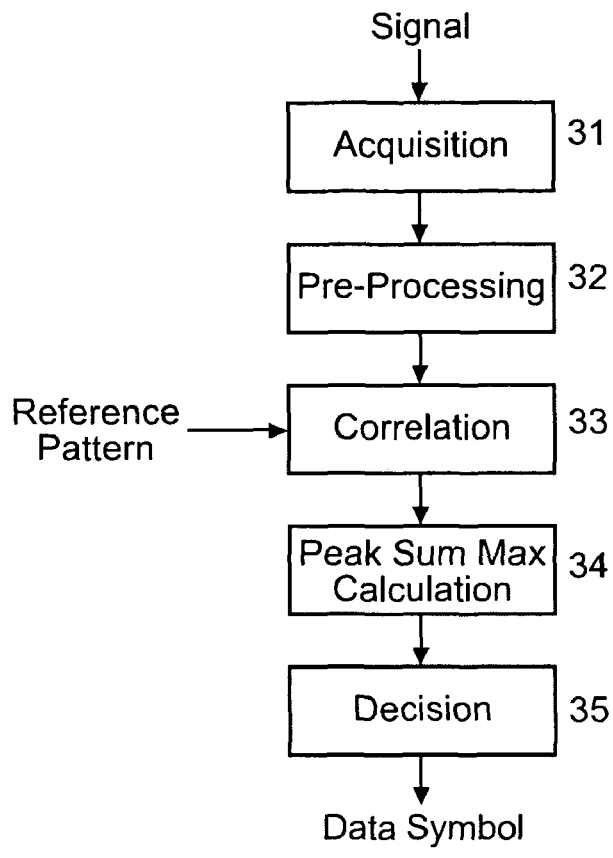
FIG. 3 flow chart for the inventive processing.

In the watermark decoder in FIG. 3, the received encoded signal x is acquired in step or stage 31. A pre-processing like spectral shaping or whitening can be carried out in step or stage 32. The resulting output signal is correlated with pseudo-random reference pattern or patterns r in step or stage 33. The cumulated maximum peak sum is calculated in step or stage 34 as described before. Thereafter it is decided in step or stage 35 which one of the pseudo-random reference patterns r has been embedded into signal x at encoder side, and the corresponding watermark data symbol is output.

Figure 4:
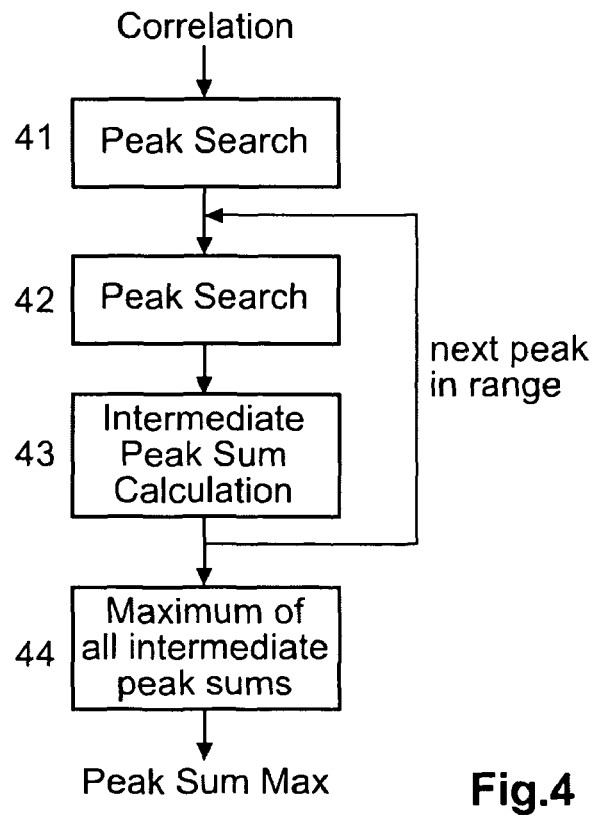
FIG. 4 flow chart for the calculation of the peak sum maximum.

In FIG. 4 the maximum peak sum calculation, carried out in step/stage 34 and described above, is depicted in more detail. The first step 41 may be a peak search initialization. In the following loop, the peaks are searched and the intermediate peak sum is calculated in steps 42 and 43, respectively. Following the loop, the maximum of all intermediate, peak sums is determined in step 44, and the maximum peak sum $sum_{max,k}$ is output.

Before, upon the largest one of the maximum sums exceeding threshold $thr_0$, issuing the final decision that corresponding reference patterns are assumed to be present in the received signal, several decoded bits of the embedded message can pass through an error correction processing.

The invention is applicable to all technologies where a correlation may be disturbed by something similar to echoes and reverberation, for example watermarked video that has been encoded perceptually.

What is claimed is:

1. A method for determining whether or not a reference pattern is present in a possibly watermarked signal which was received using a microphone, wherein at least one candidate reference pattern possibly matching said reference pattern is correlated with said received watermarked signal and corresponding correlation result amplitude peaks are checked, said method comprising:

calculating for a current section of said received signal the correlations with each one of said reference patterns;

finding within the correlation result amplitude values groups of values in which the absolute value of a current correlation result amplitude value—denoted main peak—is greater than a first threshold and that absolute value of said main peak is also greater than the absolute value of its left neighbor correlation result amplitude value and is also greater than the absolute value of its right neighbor correlation result amplitude value;

finding, within a predetermined vicinity of each one of said main peaks, further peaks for each of which the absolute value of a current correlation result amplitude value is greater than a second threshold smaller than said first threshold and for each of which further peaks its absolute value is also greater than the absolute value of its left neighbor correlation result amplitude value and is also greater than the absolute value of its right neighbor correlation result amplitude value;

combining, for each one of said groups of values, the absolute values of said main peak and said further peaks, thereby forming a sum value per group;

for each one of said reference patterns, determining the maximum one of said group sum values wherein, when the largest one of these maximum values exceed a predetermined or variable threshold, deciding that a corresponding reference pattern is assumed to be present in the received signal.

2. The method according to claim 1, wherein, instead of correlation result amplitude values, normalized correlation result amplitude values are used for determining the peak values.

3. The method according to claim 1, wherein in said combining in addition such absolute values of correlation result amplitudes that are located within a predetermined neighbor range to the left and to the right of main and further peaks and which exceed a third threshold value are involved, and wherein the corresponding absolute values of correlation result amplitudes following subtraction of a fourth threshold value representing noise are combined, and wherein said third threshold value is greater than said fourth threshold value.

4. The method according to claim 1, wherein said predetermined vicinity is non-symmetric and extends $t_1$ samples to the left and $t_2$ samples to the right, or wherein said predetermined neighbor range extends $t_3$ samples to the left and $t_3$ samples to the right, or wherein said predetermined neighbor range is non-symmetric and extends $t_3$ or $t_4$ samples to the left and $t_3$ or $t_4$ samples to the right.

5. The method according to claim 4, wherein one or more of said threshold and said first to fourth thresholds and said sample values $t_1$ to $t_4$ are predetermined, or are adapted during the processing depending on echoes and reverberation parameters in the received signal.

6. The method according to claim 1, wherein, before said correlations are calculated, the received signal is spectrally shaped or is whitened.

7. An apparatus for determining whether or not a reference pattern is present in a possibly watermarked signal which was received using a microphone, wherein at least one candidate reference pattern possibly matching said reference pattern is correlated with said received watermarked signal and corresponding correlation result amplitude peaks are checked, said apparatus comprising a decoder for:

calculating for a current section of said received signal the correlations with each one of said reference patterns;

finding within the correlation result amplitude values groups of values in which the absolute value of a current correlation result amplitude value—denoted main peak—is greater than a first threshold and that absolute value of said main peak is also greater than the absolute value of its left neighbor correlation result amplitude value and is also greater than the absolute value of its right neighbor correlation result amplitude value; and for finding, within a predetermined vicinity of each one of said main peaks, further peaks for each of which the absolute value of a current correlation result amplitude value is greater than a second threshold smaller than said first threshold and for each of which further peaks its absolute value is also greater than the absolute value of its left neighbor correlation result amplitude value and is also greater than the absolute value of its right neighbor correlation result amplitude value;

combining, for each one of said groups of values, the absolute values of said main peak and said further peaks, thereby forming a sum value per group;

determining, for each one of said reference patterns, the maximum one of said group sum values, and for deciding, when the largest one of these maximum values exceed a predetermined or variable threshold, that a corresponding reference pattern is assumed to be present in the received signal.

* * * * *